United States Patent
Virdee

(10) Patent No.: US 7,416,375 B2
(45) Date of Patent: Aug. 26, 2008

(54) THREADED COUPLING MECHANISM HAVING QUICK ENGAGING AND DISENGAGING FEATURE

(75) Inventor: Alan Virdee, Rio Linda, CA (US)

(73) Assignee: Perigee Design Incorporated, N. Highlands, CA (US)

( * ) Notice: Subject to any disclaimer, the term of this patent is extended or adjusted under 35 U.S.C. 154(b) by 213 days.

(21) Appl. No.: 11/189,502

(22) Filed: Jul. 26, 2005

(65) Prior Publication Data

US 2007/0025825 A1 Feb. 1, 2007

(51) Int. Cl.
*F16B 37/04* (2006.01)
(52) U.S. Cl. ................................ 411/433; 411/267
(58) Field of Classification Search .......... 411/437, 411/433, 267, 265–270; 285/323, 34, 309–310; 24/503, 504
See application file for complete search history.

(56) References Cited

U.S. PATENT DOCUMENTS

| | | | | | |
|---|---|---|---|---|---|
| 1,550,173 | A | * | 8/1925 | Lamar | 403/282 |
| 2,489,613 | A | * | 11/1949 | Beswick | 411/433 |
| 2,736,227 | A | * | 2/1956 | Stroble | 411/433 |
| 3,743,333 | A | * | 7/1973 | Kosinski | 403/343 |
| 4,531,872 | A | * | 7/1985 | Warkotsh | 411/433 |
| 4,768,909 | A | * | 9/1988 | Warkotsch | 411/433 |
| 4,930,961 | A | * | 6/1990 | Weis | 411/266 |
| 5,118,237 | A | * | 6/1992 | Wright | 411/433 |
| 5,139,381 | A | * | 8/1992 | Lubreski et al. | 411/433 |
| 5,282,709 | A | * | 2/1994 | Chaput et al. | 411/433 |
| 5,324,150 | A | * | 6/1994 | Fullerton | 411/267 |
| 5,378,100 | A | * | 1/1995 | Fullerton | 411/267 |
| 5,427,488 | A | * | 6/1995 | Fullerton et al. | 411/433 |
| 5,613,816 | A | * | 3/1997 | Cabahug | 411/433 |
| 5,733,084 | A | * | 3/1998 | Fullerton | 411/267 |
| 5,749,691 | A | * | 5/1998 | Campbell | 411/433 |
| 5,842,810 | A | * | 12/1998 | Morad | 403/301 |
| 5,868,538 | A | * | 2/1999 | Rathbun | 411/433 |
| 5,906,464 | A | * | 5/1999 | Wedenig | 411/433 |
| 6,053,655 | A | * | 4/2000 | Mazhar | 403/320 |
| 6,062,784 | A | * | 5/2000 | Wisser et al. | 411/267 |
| 6,406,240 | B1 | * | 6/2002 | Potter | 411/433 |
| 6,425,607 | B1 | * | 7/2002 | Potter | 285/34 |
| 6,974,291 | B2 | * | 12/2005 | Li | 411/437 |
| 7,118,303 | B2 | * | 10/2006 | Doubler et al. | 403/362 |
| 7,191,624 | B2 | * | 3/2007 | Beylotte et al. | 70/257 |
| 2003/0214112 | A1 | * | 11/2003 | Chou | 280/278 |

FOREIGN PATENT DOCUMENTS

DE 3210448 A1 * 9/1983

* cited by examiner

*Primary Examiner*—Flemming Saether
(74) *Attorney, Agent, or Firm*—Fliesler Meyer LLP

(57) ABSTRACT

A bolt coupling device which has a body with a chamber, an inlet and an outlet. The coupling device includes a coupling mechanism. The coupling mechanism includes a threaded surface along a bolt receiving channel. The coupling device includes a spring member that urges the threaded surfaces toward a first axis, and a cam member between two coupling segments which is rotatable. The cam member separates the first and second coupling segments to increase the dimension of the bolt receiving channel to selectively engage and disengage a bolt. The cam member can be positioned along a second axis which is parallel to the first axis or perpendicular to the first axis.

20 Claims, 8 Drawing Sheets

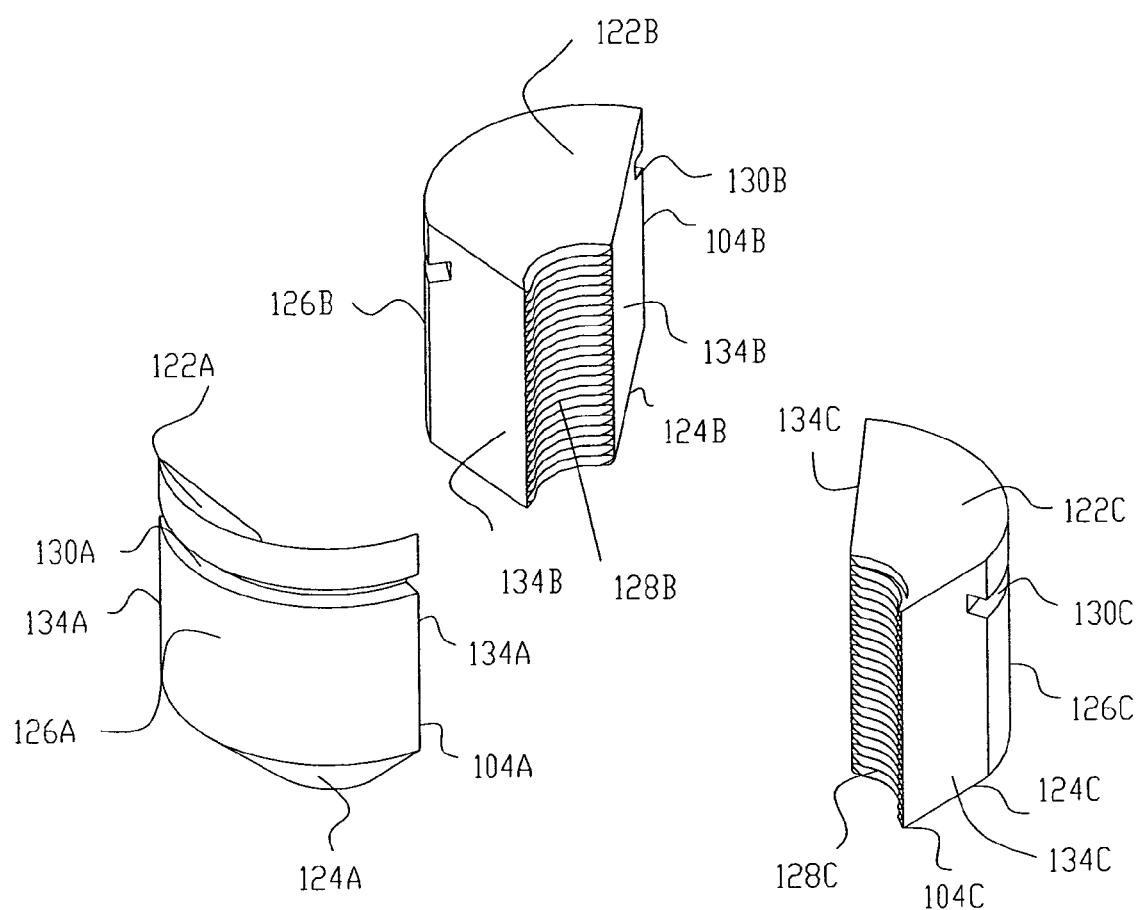

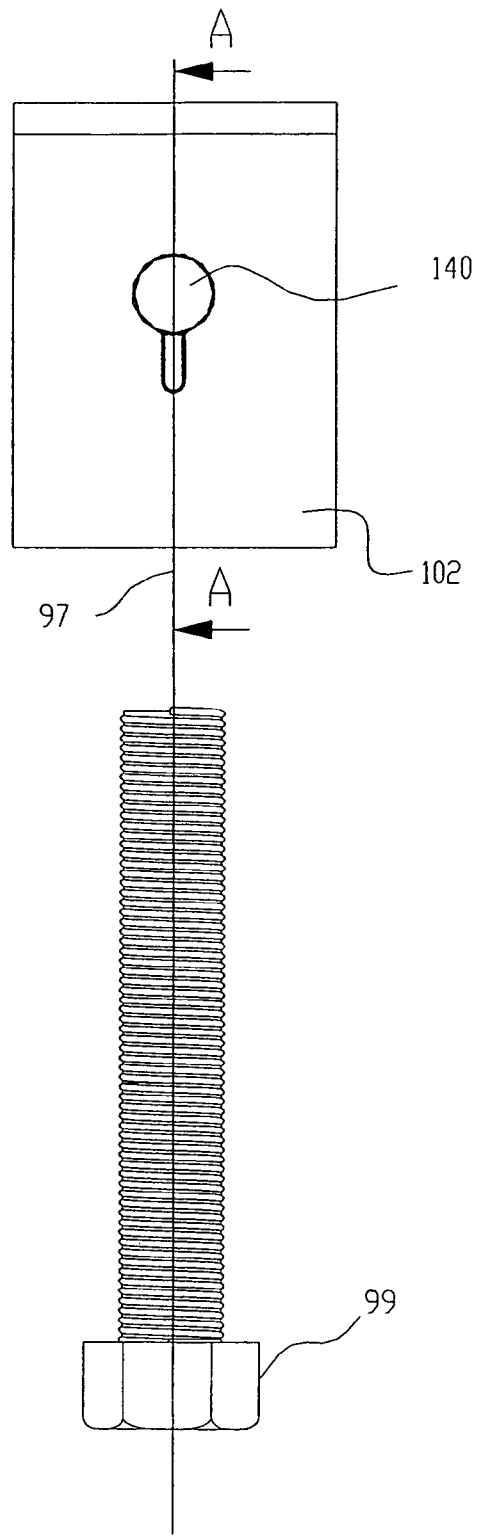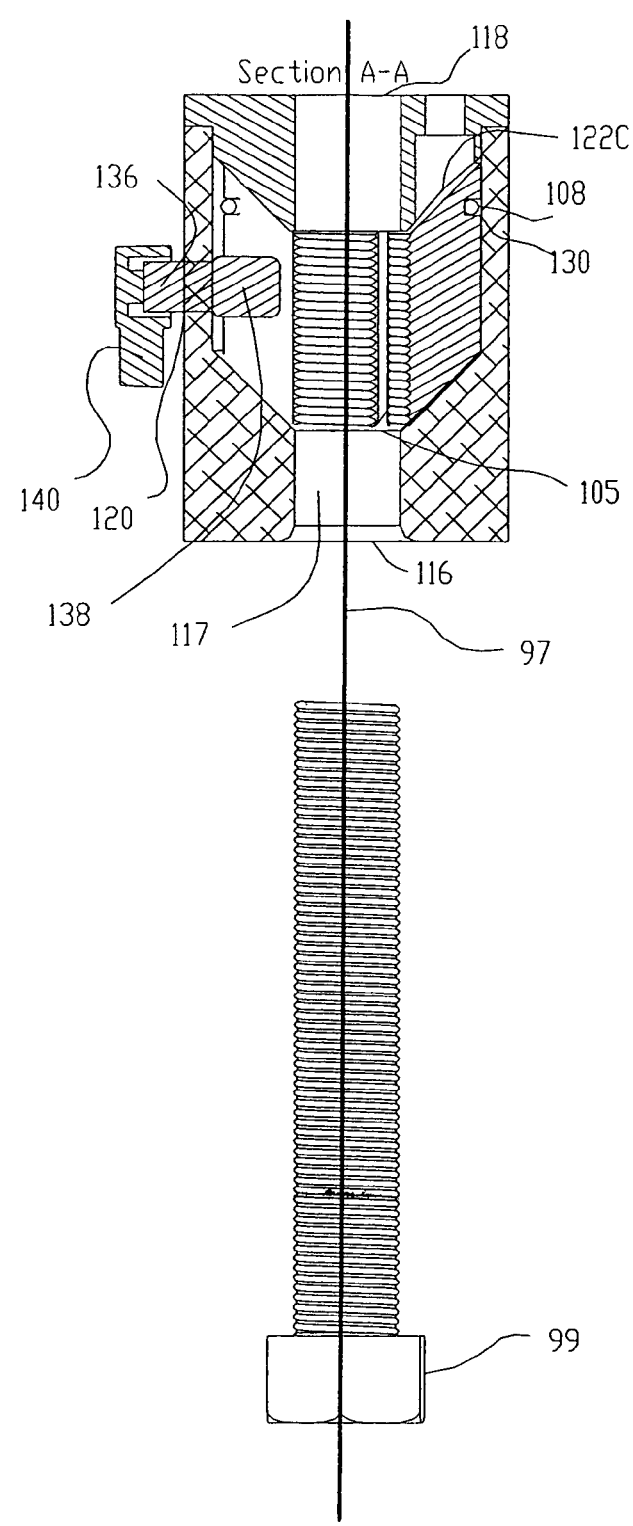

SECTION B-B

SECTION C-C

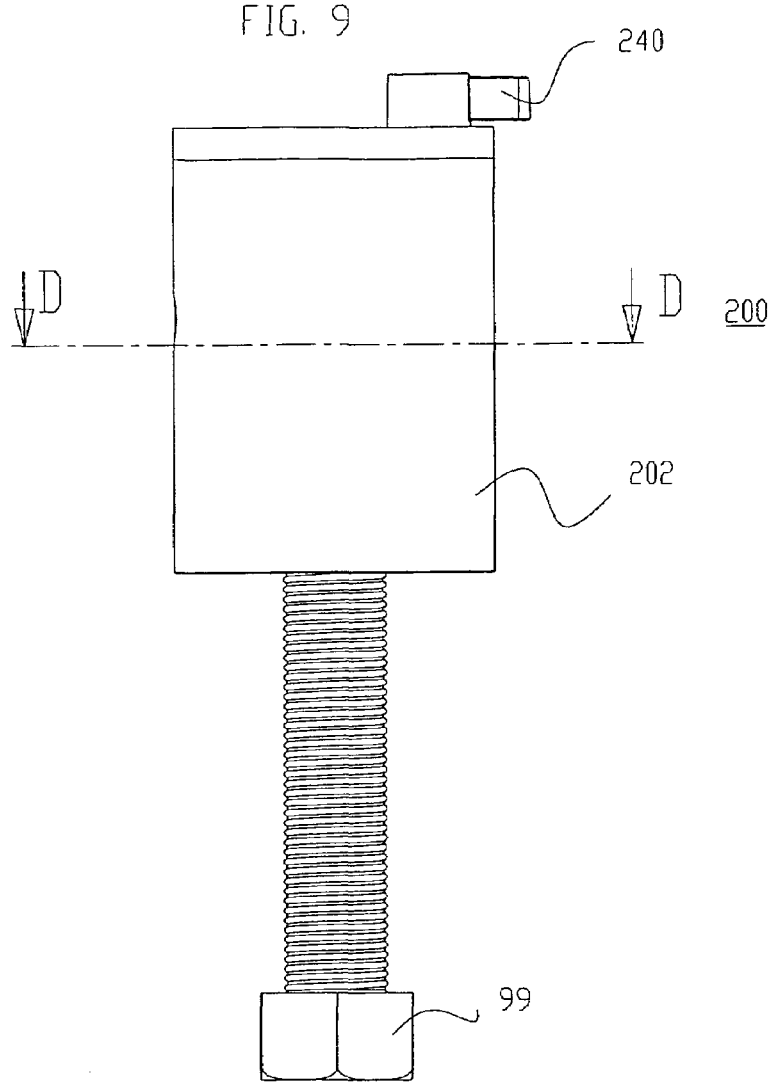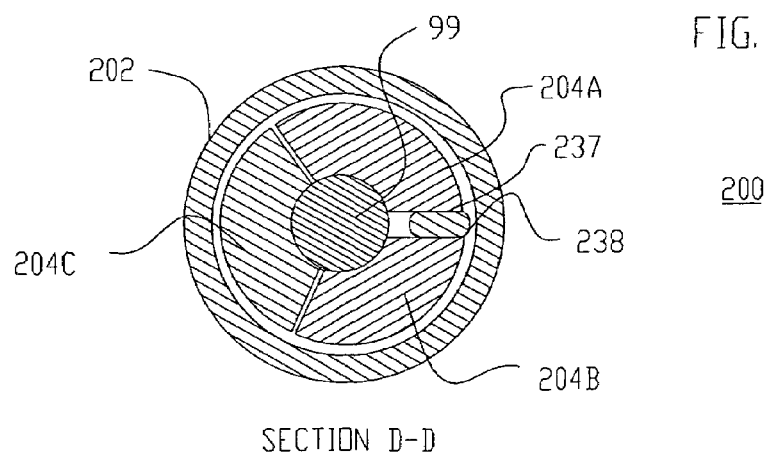

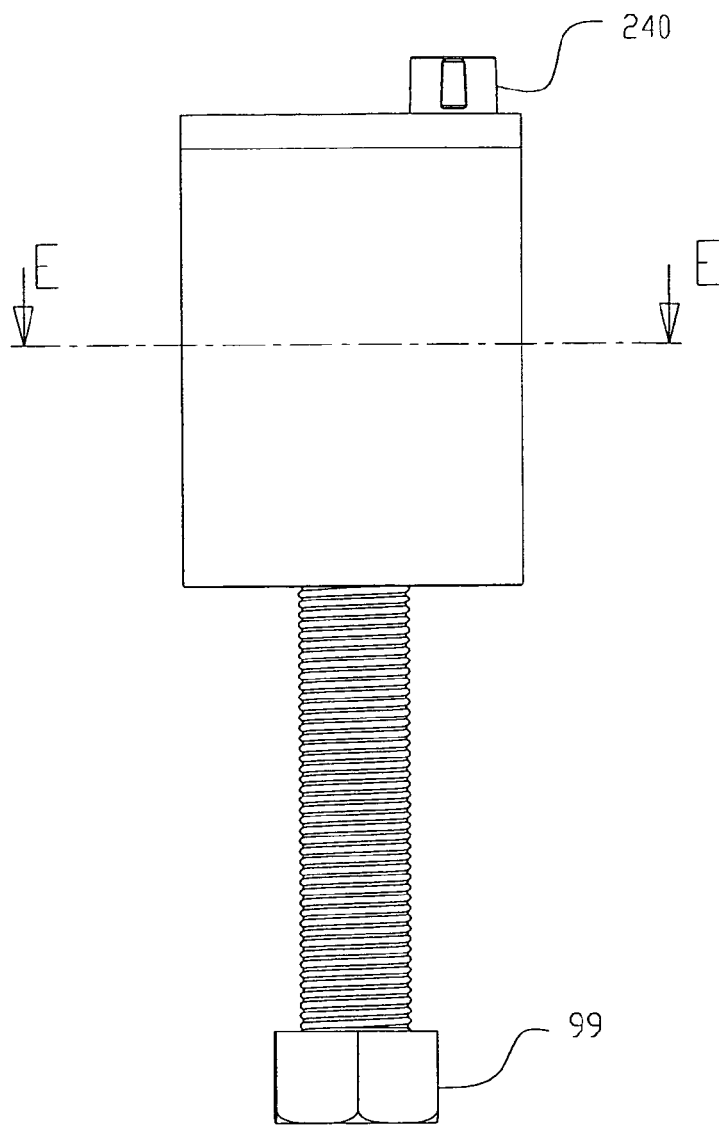
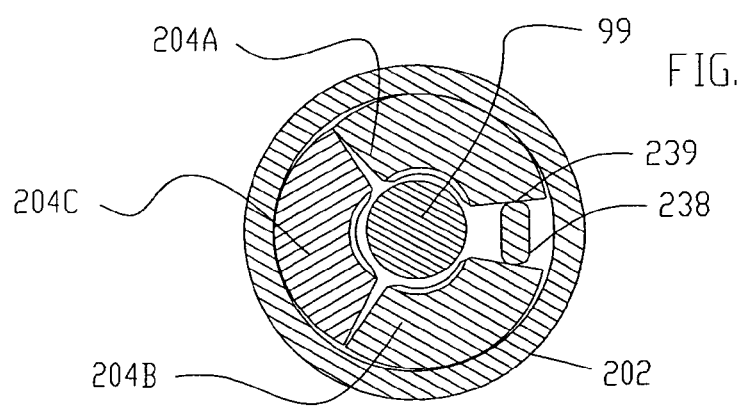

THREADED COUPLING MECHANISM HAVING QUICK ENGAGING AND DISENGAGING FEATURE

FIELD OF THE INVENTION

The present invention relates generally to a coupling mechanism and, in particular, a threaded coupling mechanism having quick engaging and disengaging feature.

BACKGROUND OF THE INVENTION

Many rapidly engaging threaded fasteners exist in the industry that utilize two or more threaded segments biased inwards with a spring such that when a bolt is inserted in the correct direction into the fasteners, the fasteners ratchet over the bolt to secure the bolt. The term "bolt" refers to a male threaded element that can be hollow or solid.

Some threaded fasteners include a thread disengagement feature which can provide a lock or a ratchet type of rapid disengagement mechanism. These fasteners allow the bolt to be inserted in a relatively quick manner, but also allow the bolt to be disengaged. These fasteners involve an axial movement of a sleeve when the fastener is actuated, whereby the sleeve is connected to each individual thread segment. However, these existing fasteners are complex in design and include many individual components. Such a complex design increases the risks of failure due to the several inter-workings between components. In addition, such a complex design is expensive to manufacture as well as maintain in corrosive environments (e.g. underwater applications).

What is needed is a device having a threaded coupling mechanism utilizing a quick engagement and disengagement feature which includes a lesser number of parts and is simpler in design than the locking mechanisms described above.

BRIEF DESCRIPTION OF THE FIGURES

FIG. 1B illustrates an exploded view of the coupling mechanism in accordance with one embodiment of the present invention.

FIG. 2 illustrates a side view of the device with disengaged bolt in accordance with one embodiment of the present invention.

FIG. 3 illustrates a cross-sectional view of the device in FIG. 2 along line A-A in accordance with one embodiment of the present invention.

FIG. 9 illustrates a side view of the device with engaged bolt and in an engaged position in accordance with one embodiment of the present invention.

FIG. 10 illustrates a cross-sectional view of the device in FIG. 9 along line D-D in accordance with one embodiment of the present invention.

FIG. 11 illustrates a side view of the device with engaged bolt and in a disengaged position in accordance with one embodiment of the present invention.

FIG. 12 illustrates a cross-sectional view of the device in FIG. 11 along line E-E in accordance with one embodiment of the present invention.

DETAILED DESCRIPTION OF THE PRESENT INVENTION

Figure 1A:
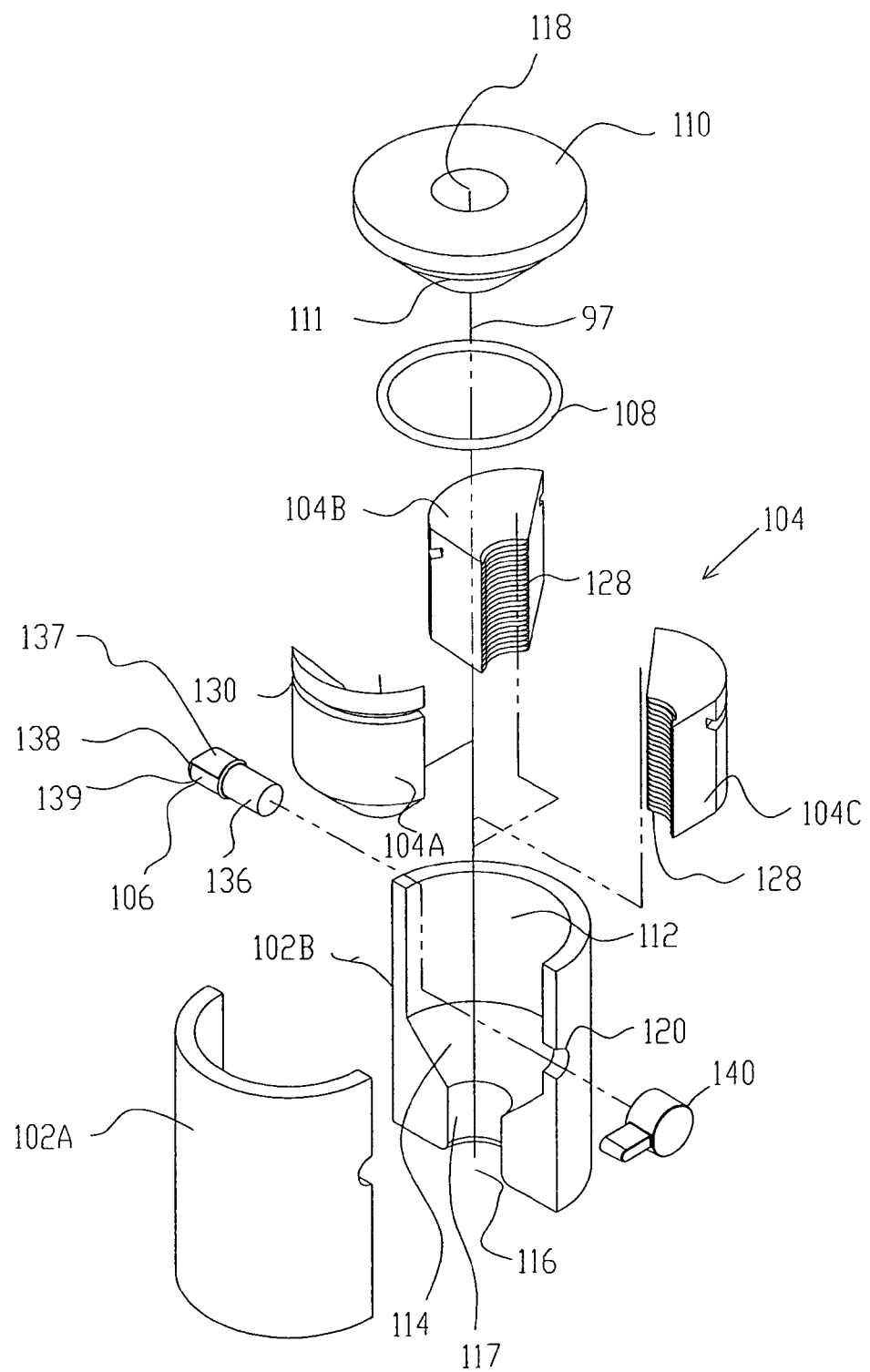
FIG. 1A illustrates an exploded view of the device in accordance with one embodiment of the present invention.

The preferred invention is directed to a device with a threaded coupling mechanism having a quick engaging and disengaging feature. The present invention is simpler in design than any other previous designs with a disengagement feature and preferably has fewer components. The present invention can be used in applications including, but not limited to: all types of clamps, vises, jacks, modular furniture jacks, struts, hydraulic struts, rescue tools, hydraulic tensioning devices, load lifting tools, robotic undersea devices, robotic aerospace devices as well as other robotic devices, docking and EVA tools, high repetition clamping tools, fluid connectors, or hose connectors. The present design is also applicable to many power screw applications.

FIG. 1 illustrates an exploded view of the device in accordance with one embodiment of the present invention. As shown in FIG. 1, the device 100 preferably includes a body 102, a threaded coupling mechanism 104, an actuating member 106, a spring member 108, and a top lid 110. In particular, the body 102 in FIG. 1 preferably includes two half components 102A, 102B which are coupled together to form the body 102. Alternatively, any number of components can be coupled together to form the body 102. In another embodiment, the body 102 is initially formed as one piece.

The interior of the body 102 preferably includes a chamber 112 which contains the threaded coupling mechanism 104 as well as an angled seat 114. The body 102 also includes a pair of apertures 116, 118. One aperture 116 is in communication with an entry bore 117 which leads into the chamber 112 and is in communication with the opposing aperture 118. The apertures 116, 118 allow insertion of a bolt 99 (FIG. 2) into the body 102. The apertures 116, 118 along with the entry bore 117 are oriented along a center axis 97. In addition, the threaded coupling segment 104A-104C of the coupling mechanism 104 is positioned around the axis 97 such that the threaded interior surfaces 128 of coupling mechanism 104 are preferably equidistant of the axis 97. The apertures 116, 118, bore 117 and threaded interior surfaces 128 thus form a bolt receiving channel which is oriented along the center axis 97 through which the bolt 99 passes when engaged or disengaged from the device 102.

Additionally, the body 102 in the embodiment in FIG. 1A includes a side aperture 120 which is located through the outer surface of the body 102 and leads into the chamber 112. The side aperture 120 preferably receives the actuating member 106 and orients the actuating member 106 to be substantially perpendicular to the axis 97, although not necessarily as discussed below.

The threaded coupling mechanism 104 in the embodiment in FIG. 1A preferably includes three individual coupling segments labeled 104A, 104B and 104C. As shown in FIG. 1B, the coupling segments 104A-104C each preferably have a top surface 122A-122C, a bottom surface 124A-124C, a rounded outer or exterior surface 126A-126C, and a threaded interior surface 128A-128C. In addition, each coupling segment 104 includes a pair of side walls 134A-134C, respectively, which extend between the threaded interior surface 128 and the exterior surface 126A-126C. Each coupling segment 104A-104C preferably includes a groove 130A-130C on the exterior surface 126A-126C, whereby the coupling segments 104A-104C preferably form a continuous groove 130 around the exterior surface 128 when the coupling mechanism 104 is positioned in the housing 102. The groove 130 preferably receives the spring 108, whereby the spring 108 urges or biases the coupling segments 104A-104C toward each other and the center axis 97. It should be noted that although the groove 130 is shown in FIGS. 1A and 1B as closer toward the top surface 122 of the coupling segments 104A-104C, the groove 130, and thus the spring 108, can be located anywhere along the outer surface of the coupling segments 104. It should also be noted that although one groove 130 and corresponding spring 108 is shown and described herein, any number of grooves and corresponding springs are contemplated.

The biasing force which urges the threaded surfaces 128A-128C of the coupling segments 104A-104C inward toward the center axis 97 can be applied in many ways and is not limited to use of the spring 108 described above. Some examples include, but are not limited to, elastomers, coil springs, magnets or elastic foam which can be used to urge the threaded surfaces 128A-128C of the coupling segments 104A-104C toward the center axis 97. In one embodiment, a separate biasing mechanism is provided for each coupling segment 104 such that a same or different amount of force is applied on each individual coupling segment 104. One configuration could include one or more springs positioned between the inner wall of the body 102 and the outer wall of each coupling segment 104 to bias the coupling segments toward the center axis 97.

Figure 5:
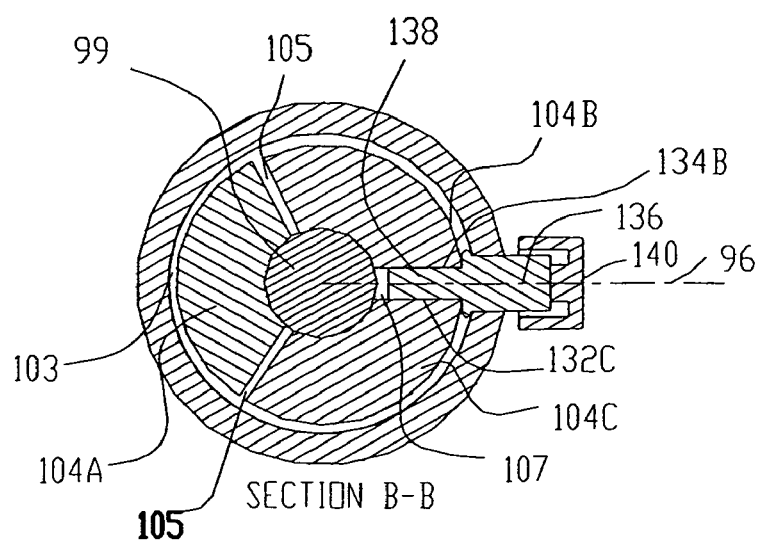
FIG. 5 illustrates a cross-sectional view of the device in FIG. 4 along line B-B in accordance with one embodiment of the present invention.

The exterior surface 126 of each coupling mechanism 104 has a radius which is slightly smaller than the radius of the interior surface of the chamber 112. This allows the coupling segments 104A-104C enough clearance to move to increase the diameter of the bolt receiving channel and disengage the bolt 99 from the device 100. The diameter formed by the threaded interior surfaces of the coupling segments 104A-104C is preferably at least that of the bottom and/or top openings 116, 118 in the body 102. In one embodiment, the threaded interior surface of each coupling segment is separated from the threaded interior surface of the adjacent coupling segments by a small gap 105, as shown in FIGS. 3 and 5. However, the presence of the gap 105 does not inhibit or prevent the received bolt 99 from being securely engaged by the threaded interior surface of the coupling mechanism 104.

Referring back to FIG. 1B, the bottom surface 124A-124C of each coupling segment 104A-104C preferably slopes downward from the outer surface 126A-126C toward the threaded interior surface 128A-128C. The sloping bottom surfaces 124A-124C together form an overall conical bottom surface 124 of the coupling mechanism 104 which conforms to the angled seat 114 in the chamber 112. The angled seat 114 and conical bottom surface 124 serve to guide each coupling segment 104A-104C, and thus the entire coupling mechanism 104, toward the central axis 97 such that the bolt receiving channel is positioned and centered along the central axis 97. Therefore, the angled seat 114 and bottom surface 124 ensure that the bolt 99 can be inserted into the bolt receiving channel and engaged with the threaded interior surface 128 of the coupling mechanism 104. It should be noted that the conical bottom surface 124 is one design which ensures that the coupling segments 104A-104C are correctly guided toward the center axis 97. It is contemplated that the device 100 can be configured in any other appropriate manner to ensure the correct positioning of the coupling mechanism 104 along the center axis 97.

In one embodiment, the top surfaces 122A-122C of the coupling segments 104A-104C slope downward from the outer surface 126 toward the threaded interior surface 128, as shown in FIG. 3. The sloping top surface mates and conforms with the conical bottom surface 111 of the top cap 110, whereby the bottom surface 111 aids in guiding the coupling segments 104A-104C toward and away from the center axis 97.

The side surfaces of each coupling segment 104A-104C are angled inward from the outer surface 126 to the threaded interior surface 128 to form a trapezoidal cross-sectional shape as shown in FIG. 5. Each coupling segment 104A-104C preferably has the same trapezoidal cross-section such that the side surfaces are parallel with the side surfaces of the adjacent coupling segments 104 as shown in FIG. 5.

The actuating member 106 shown in the embodiment in FIG. 1A preferably includes a shaft 136 having a cam 138 at one end and a handle 140 at the opposing end. The actuating member 106 preferably extends through the side aperture 120 into the housing 102, whereby the shaft 136 and cam 138 are located within the housing 102 and the handle 140 is located outside of the housing 102. Preferably, the handle 140 is separable from the shaft 136 to allow the shaft 136 to be passed through the side aperture 120 in the outer body 102 during assembly and disengagement. In another embodiment, the actuating member 106 is one piece. The cam 138 is rotatable about the shaft section 136 along axis 96 and is preferably slightly larger than the side aperture 120 to prevent the actuating member 106 from falling out of the housing 102.

The cam 138 preferably has a rectangular cross-section and has two larger dimensioned faces 137 (FIG. 1A) and two smaller dimensioned, and preferably rounded, faces 139 (FIG. 1A) on the ends. The smaller dimensioned faces 139 are thus further separated from one another than the faces 137 of the cam 138. As shown in FIG. 3, the larger dimensioned faces 137 are in contact with the side surfaces of the coupling segments in the non-actuated or closed position. Additionally, as shown in FIG. 5, the smaller dimensioned faces 139 are in contact with the side surfaces of the coupling segments in the actuated or open position. It should be noted that although the cam 138 preferably has a rectangular cross-section, the cam 138 can have a semicircular, triangular, trapezoidal or any other appropriately shaped cross-section.

Figure 4:
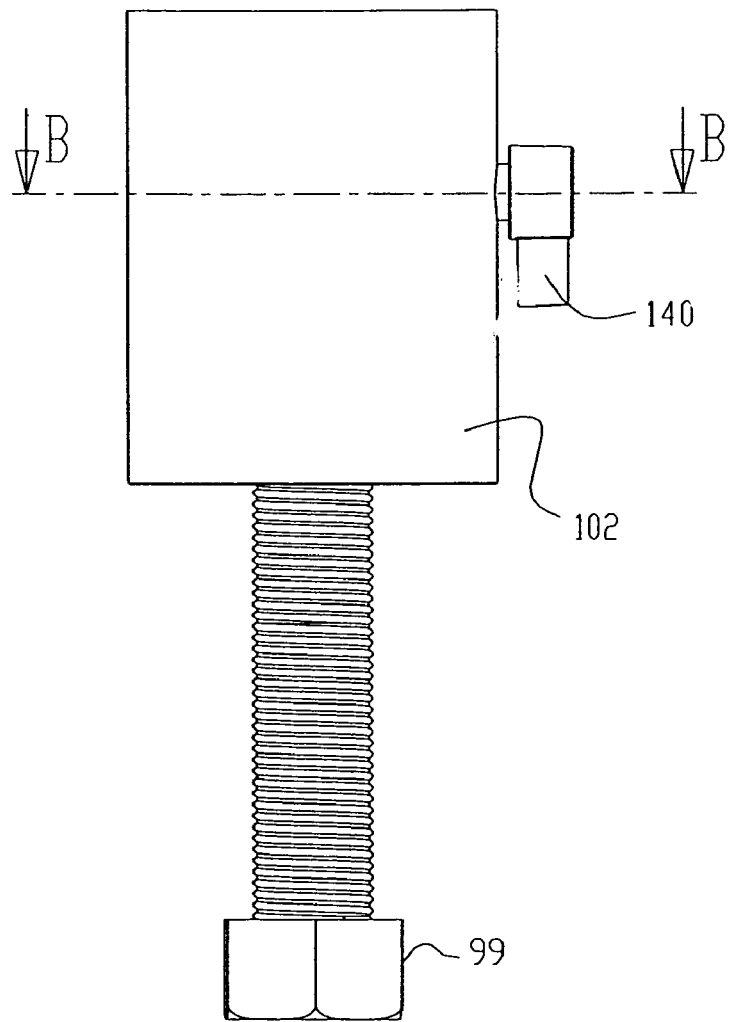
FIG. 4 illustrates a side view of the device with engaged bolt and in an engaged position in accordance with one embodiment of the present invention.

FIG. 4 illustrates a side view of the present device with a bolt 99 inserted into the bolt receiving channel in accordance with one embodiment. FIG. 5 illustrates a cross sectional view of the device along line B-B in the closed non-actuated position in accordance with one embodiment of the present invention. As shown in FIG. 5, the three coupling segments 104A-104C are positioned within the housing 102, whereby each coupling segment has a space or gap 105 between its side walls and the side walls of the neighboring coupling segments. In addition, a gap exists between the outer surfaces of the coupling segments and the surface of the chamber 112.

As shown in FIG. 5, the cam 138 is also preferably positioned between the side walls of adjacent coupling segments 104B and 104C. Although the cam 138 is shown positioned between the side walls of the neighboring coupling segments, the cam 138 may abut an extension of the coupling segments 104 exterior to the side walls, thereby increasing the distance from the cam 138 to the bolt receiving channel. The cam 138 is positioned in the non-actuated position, whereby the thinnest dimension of the cam 138 separates the coupling segments 104B and 104C. Nonetheless, the gaps 105 between the side walls of the coupling segments 104A-104C allow the threaded surfaces 128 to maintain the bore diameter and allow the bolt to be screwed into the device 100.

Figure 6:
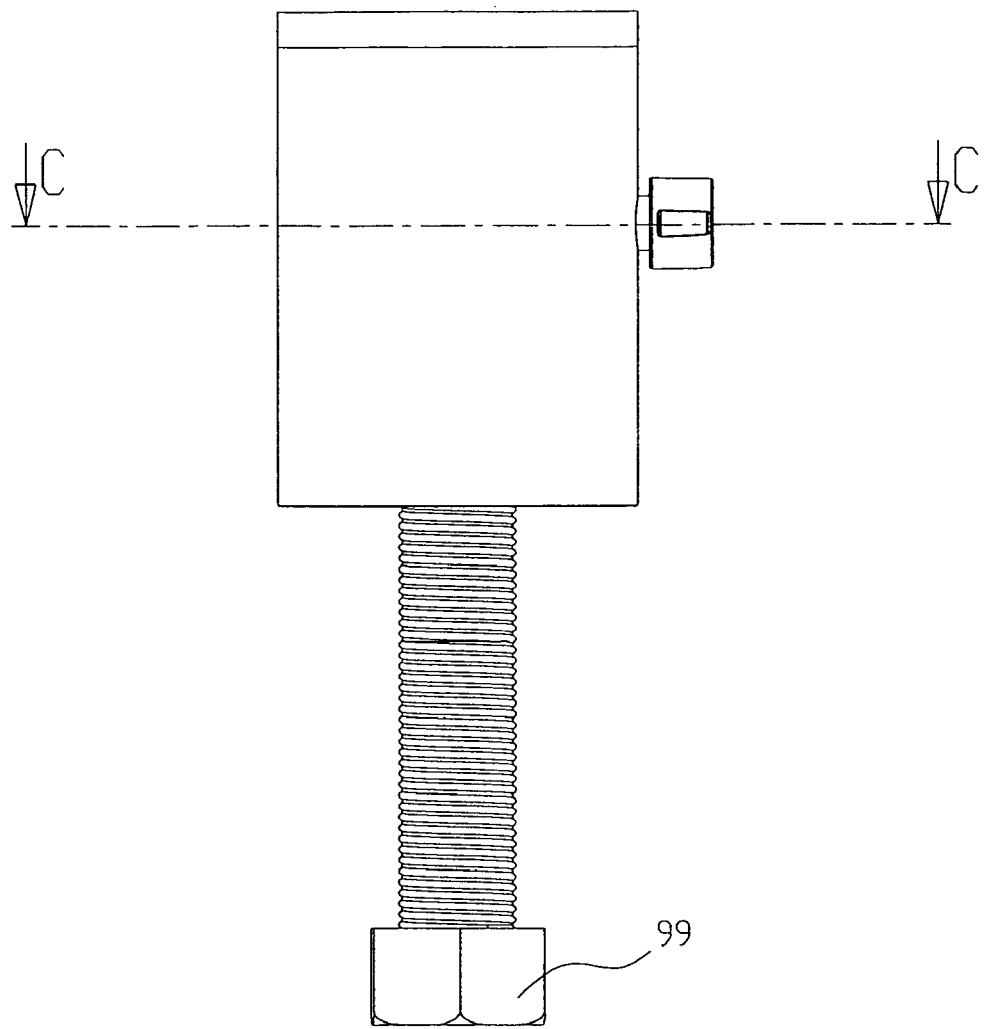
FIG. 6 illustrates a side view of the device with engaged bolt and in a disengaged position in accordance with one embodiment of the present invention.
Figure 7:
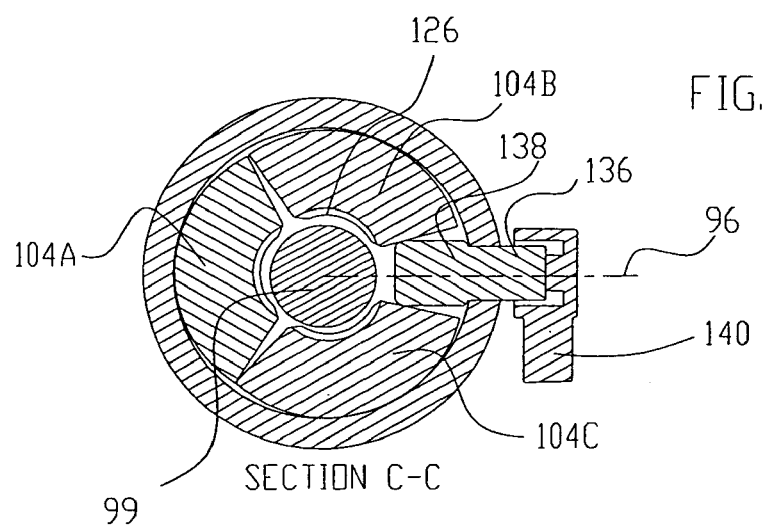
FIG. 7 illustrates a cross-sectional view of the device in FIG. 4 along line C-C in accordance with one embodiment of the present invention.

FIG. 6 illustrates a side view of the present device with a bolt 99 inserted into the bolt receiving channel in accordance with one embodiment. FIG. 7 illustrates a cross sectional view of the device 100 in the open position along line C-C in accordance with one embodiment of the present invention. As shown in FIG. 7, the actuating member 106 is rotated about axis 96 such that the cam 138 has rotated approximately ninety degrees. The wider dimension of the cam 138 thus pushes the side walls of the adjacent coupling segments 104B and 104C apart. This separation shown in FIG. 7 causes the coupling segments 104B and 104C to move away from the center axis 97, whereby the side walls of coupling segments 104B and 104C contact and force the coupling segment 104A to also move away from the center axis 97. This actuation causes the coupling segments 104A-104C to increase the diameter of the bolt receiving channel, thereby providing clearance between the inner threaded surface 126 and the bolt 99 to allow the bolt 99 to be axially removed from the bolt receiving channel.

In the actuated position shown in FIG. 7, the spring member 108 preferably continues to urge the coupling segments 104A-104C to their neutral, non-actuated state in FIG. 5. Thus, once the handle 140 is rotated about the axis 96 and the cam 138 is rotated to its non-actuated position, as in FIG. 5, the spring member 108 urges the coupling segments 104A-104C to automatically retreat to their non-actuated position as in FIG. 5. The natural inward biasing of the coupling segments 104 and the shape of the cam 138 preferably provides the user with a positive lever feel that there is a detent in either the closed and open position. Considering that the handle 140 can rotate 90 degrees in either direction to actuate the device between the open and closed position, the handle 140 can simulate the open and closed position, such as with a valve. Alternately, for remotely controlled applications, an external member actuates the cam 138 or handle 140 remotely between the open and closed positions.

As discussed above, the actuating member 104 performs the function of bolt disengagement by increasing the diameter of the bolt receiving channel. The cam 138 also preferably performs the function of torsion transmission. When the actuating member 106 is in the non-actuated position (FIG. 5), the threaded bolt receiving channel is at the diameter to allow the bolt 99 to be screwed into and securely engaged in the device 100. Upon the bolt 99 being screwed into the threaded bolt receiving channel, the bolt 99 will transmit torque forces onto the threaded interior surfaces as well as the entire coupling member 104. The cam 138 transmits this torque to the body 102 and thereby prevents the coupling segments 104A-104C from slipping. Thus, the cam 138 maintains the coupling member in its position to allow the bolt to be secured thereto.

In addition, considering that the coupling segments 104 are biased against the bolt 99, a significant amount of turning force may be applied to the actuating member 106 to actuate the coupling mechanism 104 and release the bolt 99. A high load capacity cam arrangement can be utilized to work in conjunction with appropriate cone angles to provide a remote load release feature for load lifting applications if desired.

Although the present description involves use of one actuating member 106 in association with the coupling segments 104, the present device can be configured to include more than one actuating member 104. For instance, two actuating member can be utilized at opposing ends with a device having an even number of coupling segments 104. In one embodiment, both actuating members can be aligned parallel with one another. In another embodiment, one actuating member 106 can oriented transverse to the other actuating member 106.

The coupling segments 104A-104C can be made whole and then cut or formed by means of PM (powder metal), MIM (metal injection molding), die cast or other material. The slot where the cam resides is made to the nominal minimum thickness of the cam. If PM or MIM is used, then the coupling segments can be made to have a zero nominal gap. If the coupling segments 104 are initially formed as one piece then cut into thirds, the missing cut in the cut thread segments needs to be compensated for with the use of a spacer, possibly integrated with a spring in a C-clip arrangement. Material could be deformed from the area adjacent to the cut in the thread segments into the cut area to compensate for the missing cut material. The actuating member 106 is preferably made of a material strong enough to overcome the biasing and load forces exerted onto the coupling segments.

Figure 8:
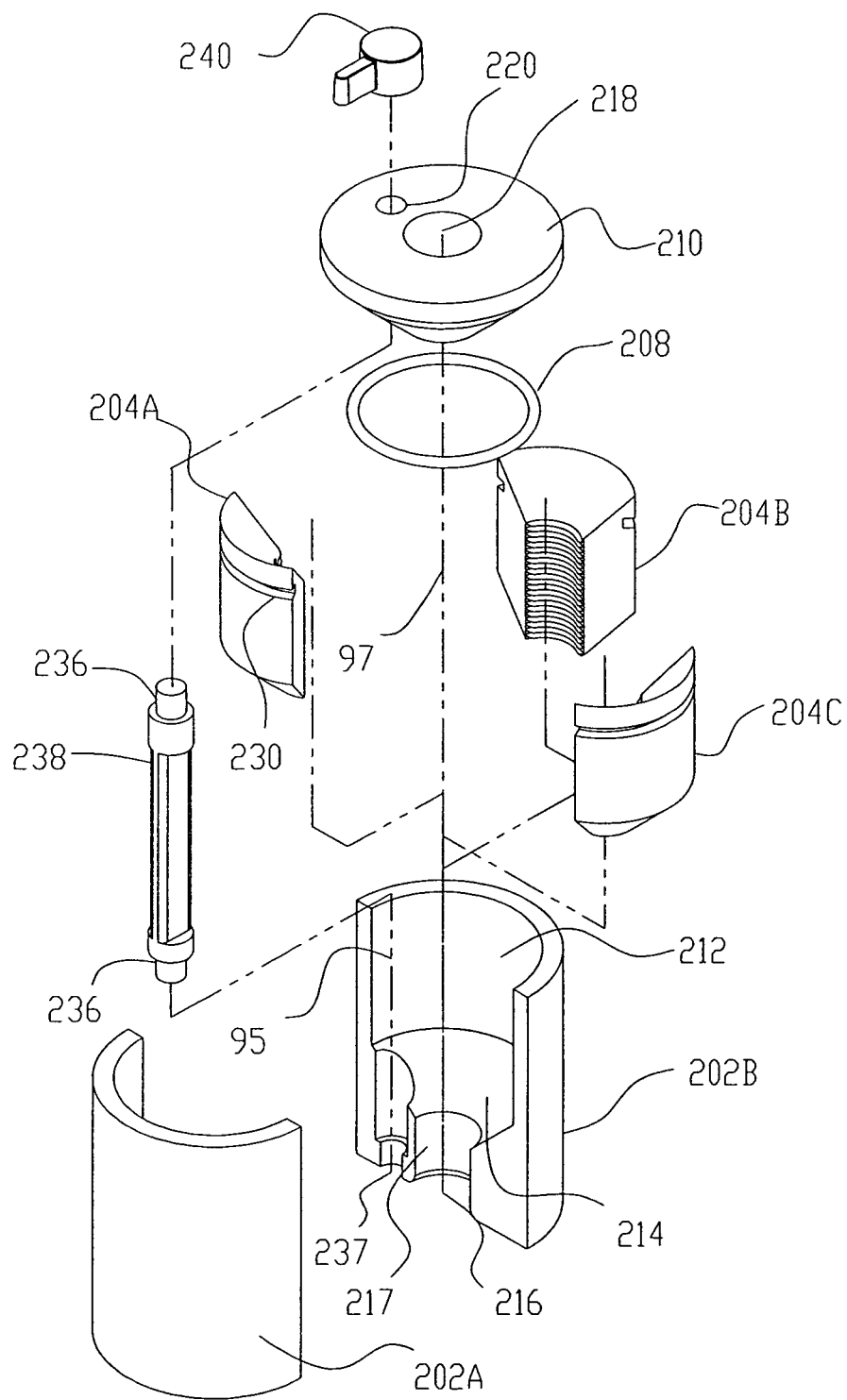
FIG. 8 illustrates an exploded view of the device in accordance with one embodiment of the present invention.

FIG. 8 illustrates another embodiment of the device in accordance with the present invention. The embodiment in FIG. 8 includes the same features as that shown in FIG. 1A, however, the device 200 is configured such that the actuating member 206 is oriented parallel to the center axis 97. In particular, the actuating member 206 preferably includes a two opposing shaft sections 236 and a cam 238 positioned therebetween. A portion of the actuating member 206 preferably fits in a cam seat 237 located within the chamber 212. As shown in FIG. 8, the cam 238 extends longitudinally and is oriented lengthwise parallel with the center axis 97. This orientation allows the actuating member to be mounted through an aperture 220 in the top cap 210 such that device 200 can be actuated from top instead of the side (as shown in FIG. 1).

FIG. 9 illustrates a side view of the present device 200 with a bolt 99 inserted into the bolt receiving channel in accordance with one embodiment. FIG. 10 illustrates a cross sectional view of the device in FIG. 8 along line D-D in the closed position in accordance with one embodiment of the present invention. As shown in FIG. 10, the three coupling segments 204A-204C are positioned within the housing 202, whereby each coupling segment 204A-204C preferably has a space or gap between its side walls and the side walls of the neighboring coupling segments. As shown in FIG. 10, the cam 238 is preferably positioned such that the larger dimensioned side 237 is in contact with the side walls and of adjacent coupling segments. The cam 238 is positioned in the non-actuated position, whereby the thickness dimension of the cam 238 separates the coupling segments 204B and 204C. Nonetheless, the gaps between the side walls of the coupling allow the threaded surfaces 228 of the coupling segments to maintain the diameter of the bolt receiving channel.

FIG. 11 illustrates a side view of the present device with a bolt 99 inserted into the bolt receiving channel in accordance with one embodiment. FIG. 12 illustrates a cross sectional view of the device 200 along line E-E in the open position in accordance with one embodiment of the present invention. As shown in FIG. 12, the actuating member 206 is turned to the actuated position such that the cam 238 is rotated approximately ninety degrees with respect to the axis 96. In the actuated position, the smaller dimensioned side 239 of the cam 238 is in contact with the side walls such that the sides 239 force the side walls of the adjacent coupling segments apart further than that shown in FIG. 10. This separation causes the coupling segments 204B and 204C to move away from the center axis 97, whereby the side walls of coupling segments 204B and 204C contact and force the coupling segment 204A to also move away from the center axis 97.

Thus, the coupling segments 204A-204C increase the diameter of the bolt receiving channel, thereby providing clearance between the inner threaded surface and the bolt 99 to allow the bolt 99 to be axially removed from the bolt receiving channel. It is advantageous for the cam 238 to be between the side walls of the coupling segments as shown in FIG. 12 and not allowed to extend past the inner threaded surface or the outer surface of the adjacent coupling segments. Preferably, this ensures that the two coupling segments in contact with the cam 238 force the third coupling segment to also disengage from the bolt 99. It should be noted that although the orientation of the cam has been parallel or perpendicular to the center axis 97, the cam an be oriented at any angle with respect to the center axis 97.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A coupling device comprising:
   a. a body;
   b. a plurality of coupling segments within the body, the coupling segments positioned about a central axis including a receiving channel adapted to receive an engageable member, the coupling segments configured to selectively expand the receiving channel between a first diameter and a second diameter, wherein the coupling segments are unattached to the body;
   c. a biasing member engaged to the coupling segments, the biasing member urging the coupling segments toward each other about the central axis; and
   d. an actuating member positioned between two coupling segments, wherein the actuating member is rotated within the body to expand the receiving channel between the first diameter and the second diameter, the actuating member including side faces having a first dimension and a second dimension, wherein the receiving channel is at the first diameter when the side faces of the actuating member having the first dimension are in contact with the two coupling segments and the receiving channel is at the second diameter when the side faces of the actuating member having a second dimension are in contact with the two coupling segments.

2. The coupling device of claim 1 wherein the actuating member is oriented perpendicular to the central axis of the body.

3. The coupling device of claim 1 wherein the actuating member is oriented parallel to the central axis of the body.

4. The coupling device of claim 1, each coupling segment having an arcuate outer surface such that the coupling mechanism includes a circular outer surface.

5. The coupling device of claim 1, comprising: three or more coupling segments.

6. The coupling device of claim 1 wherein the side surface of each coupling segment is angled inward from an outer surface to a threaded interior surface to form a trapezoidal cross-sectional shape for each coupling segment.

7. The coupling device of claim 1 wherein the bottom surface of each coupling segment slopes downward from an outer surface toward a threaded interior surface, wherein the sloping bottom surfaces of all the coupling segments together form an overall conical bottom surface which conforms to an angled seat within the body.

8. The coupling device of claim 1 wherein the actuating member includes a shaft having a cam at one end and a handle at the opposing end, wherein the cam is located within the body and the handle is located outside of the body.

9. A coupling device comprising:
   a. a body having a chamber therein;
   b. a plurality of coupling segments positioned about a central axis within the chamber, each coupling segment having an outer surface and a threaded inner surface, the inner surfaces of the coupling segments being collectively adapted to form a receiving channel having a diameter, the coupling segments being configured to selectively expand the receiving channel to receive an engageable member, wherein the coupling segments are unattached to the body;
   c. a biasing member engaged to the coupling segments, the biasing member urging the coupling segments toward each other about the central axis; and
   d. an actuating member positioned between a first and a second coupling segment, the actuating member including side faces having a first dimension and a second dimension, wherein the actuating member is rotated within the body to force the first and the second coupling segments away from one another to increase the receiving channel diameter, wherein the receiving channel is at a first diameter when the side faces of the actuating member having the first dimension are in contact with the first and second coupling segments and the receiving channel is at a second diameter when the side faces of the actuating member having the second dimension are in contact with the first and second coupling segments.

10. The coupling device of claim 9 wherein the actuating member is oriented perpendicular to the central axis of the body.

11. The coupling device of claim 9 wherein the actuating member is oriented parallel to the central axis of the body.

12. The coupling device of claim 9 wherein the chamber comprises an angled seat, the outer surface of each coupling segment including a conical bottom surface which conforms to the angled seat in the chamber.

13. The coupling device of claim 9 wherein the outer surface of each coupling segment includes a groove, the biasing member including a spring member configured to fit around the outer surface of the coupling mechanism within the groove.

14. The coupling device of claim 9 wherein the side surface of each coupling segment is angled inward from an outer surface to a threaded interior surface to form a trapezoidal cross-sectional shape for each coupling segment.

15. The coupling device of claim 9 wherein the actuating member includes a shaft having a cam at one end and a handle at the opposing end, wherein the cam is located within the body and the handle is located outside of the body.

16. A coupling device comprising:
   a. a body having a chamber therein, the chamber comprising an angled seat;
   b. three or more coupling segments positioned about a central axis within the chamber, each coupling segment including an outer surface and a threaded inner surface, the inner surfaces of the coupling segments being collectively adapted to form a receiving channel having a diameter, the coupling segments being configured to selectively expand the receiving channel to receive an engageable member, wherein the coupling segments are unattached to the body, the outer surface of each coupling segment further comprising a groove and an angled bottom surface which conforms to the angled chamber seat;

c. a circular spring member configured to fit about the outer surface within the groove, the spring member urging the coupling segments toward each other about the central axis; and d. an actuating member positioned between a first coupling segment and a second coupling segment, the actuating member including side faces having a first dimension and a second dimension, wherein the actuating member is rotated within the chamber to expand the receiving channel diameter, wherein the receiving channel is at a first diameter when the sides faces of the actuating member having the first dimension are in contact with the first and second coupling segments and the receiving channel is at a second diameter when the side faces of the actuating member having the second dimension are in contact with the first and second coupling segments.

17. The coupling device of claim 16 wherein the cam member is oriented parallel to the central axis of the body.

18. The coupling device of claim 16 wherein the cam member is oriented perpendicular to the central axis of the body.

19. The coupling device of claim 16 wherein the side surface of each coupling segment is angled inward from an outer surface to a threaded interior surface to form a trapezoidal cross-sectional shape for each coupling segment.

20. The coupling device of claim 16 wherein the actuating member includes a shaft having a cam at one end and a handle at the opposing end, wherein the cam is located within the body and the handle is located outside of the body.

* * * * *